United States Patent
Davenel et al.

(10) Patent No.: US 11,300,384 B2
(45) Date of Patent: Apr. 12, 2022

(54) OPTICAL DETECTION DEVICE OF A SELF-GUIDED FLYING VEHICLE

(71) Applicant: SAFRAN ELECTRONICS & DEFENSE, Paris (FR)

(72) Inventors: Arnaud Davenel, Paris (FR); Daniel Marie, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/413,313

(22) PCT Filed: Dec. 19, 2019

(86) PCT No.: PCT/EP2019/086243
§ 371 (c)(1),
(2) Date: Jun. 11, 2021

(87) PCT Pub. No.: WO2020/127688
PCT Pub. Date: Jun. 25, 2020

(65) Prior Publication Data
US 2022/0018633 A1 Jan. 20, 2022

(30) Foreign Application Priority Data
Dec. 20, 2018 (FR) ...................... 1873483

(51) Int. Cl.
*F41G 7/22* (2006.01)
*F41G 7/26* (2006.01)
*G01S 7/481* (2006.01)
*F41G 7/00* (2006.01)

(52) U.S. Cl.
CPC .............. *F41G 7/2293* (2013.01); *F41G 7/26* (2013.01); *G01S 7/4816* (2013.01)

(58) Field of Classification Search
CPC ........ F41G 7/2293; F41G 7/26; G01S 7/4816; F42C 13/02
See application file for complete search history.

(56) References Cited

U.S. PATENT DOCUMENTS

| | | | |
|---|---|---|---|
| 2,823,612 A | 2/1958 | Cox et al. | |
| 4,193,072 A * | 3/1980 | McKusick | F42C 13/02 102/213 |
| 7,397,019 B1 * | 7/2008 | Byars | F41G 7/2293 250/206.1 |
| 7,804,053 B2 | 9/2010 | Baker et al. | |

(Continued)

FOREIGN PATENT DOCUMENTS

| | | | | |
|---|---|---|---|---|
| EP | 0352237 A1 * | 1/1990 | | F42C 13/02 |
| FR | 1605517 A | 6/1978 | | |

OTHER PUBLICATIONS

Feb. 19, 2020 International Search Report issued in International Patent Application No. PCT/EP2019/086243.

*Primary Examiner* — Bernarr E Gregory
(74) *Attorney, Agent, or Firm* — Oliff PLC; R. Brian Drozd

(57) ABSTRACT

An optical detection device is included in a self-guided flying vehicle, the self-guided flying vehicle being composed of a cone located at the head of the self-guided flying vehicle, a propulsion device located at the rear of the self-guided flying vehicle and a body located between the cone and the propulsion device. The optical detection device includes at least two portholes disposed in a collar on the periphery of the body of the self-guided flying vehicle.

9 Claims, 3 Drawing Sheets

(56) References Cited

U.S. PATENT DOCUMENTS

| | | | |
|---|---|---|---|
| 8,575,527 B2* | 11/2013 | Fry | F41G 7/2293 244/3.16 |
| 2001/0013565 A1* | 8/2001 | Davidovitch | F41G 7/2293 244/3.16 |

* cited by examiner

OPTICAL DETECTION DEVICE OF A SELF-GUIDED FLYING VEHICLE

TECHNICAL FIELD

The present invention relates to the field of optical detection devices installed on self-guided flying vehicles.

PRIOR ART

A self-guided flying vehicle moves in a completely automatic manner by means of an onboard guidance system the function of which is to control the change in the path of the self-guided flying vehicle in order to reach an objective. For this purpose, such a guidance system comprises firstly a detector or detection device for detecting the objective and in particular to determine the distance and the angular separation with respect to this objective and secondly an instruction producer the role of which is to calculate the commands and to transmit them to the control chain. The detectors of self-guided flying vehicles recover information coming from the environment, generally in the form of electromagnetic radiation. Depending on the detection means used, the radiation detected may be of various natures such as radar waves or optical radiation in the visible or infrared region. Imagers are also used in some cases.

With regard to the detection of optical radiation, an optical detection device for a self-guided flying vehicle generally comprises a window or porthole the transparency of which allows the incident optical signal to pass, an optical system making it possible to direct and focus the optical signal and an optical detector or sensor connected to an information-processing device.

Normally, the optical detection devices are placed at the front of the self-guided flying vehicles and more particularly on the cone thereof. This position confers on them a large field of view since no part of the vehicle forms an obstacle to the radiation coming from the front and sides of the vehicle.

One problem posed by this position at the front of the self-guided flying vehicle is the thermal heating of the optical detection device, related to the speed, or the high exposure to shocks on the portholes. In addition, this position is particularly sensitive to the warhead that may be integrated in a self-guided flying vehicle.

The use of hard materials such as sapphire for forming the portholes makes it possible to improve the strength of these portholes. The transparency of the materials in a spectral band of interest is however essential for a porthole and strength is therefore not the only criterion of choice. For example, sapphire does not make it possible to detect signals in certain infrared spectral bands, such as for example for wavelengths of between 7 and 14 µm. It is then necessary to use another material, such as zinc sulfide, which is more fragile.

Some optical detection devices have inclined portholes, which makes it possible to increase the incidence of attacks and to reduce the impact of shocks. This inclination is nevertheless limited by constraints of aerodynamics and symmetry on the cone of self-guided flying vehicles.

Some optical detection devices are also positioned on the wing unit of self-guided flying vehicles in order to limit damage.

It is desirable to provide a solution that makes it possible to limit the exposure to impacts and to thermal heating of an optical detection device of a self-guided flying vehicle. It is also desirable to provide a solution that adapts to numerous spectral detection bands. It is also desirable to provide a solution that respects the aerodynamics of the self-guided flying vehicle.

DISCLOSURE OF THE INVENTION

The invention relates to an optical detection device comprising portholes disposed in a collar on a self-guided flying vehicle.

One object of the present invention is to propose an optical detection device included in a self-guided flying vehicle, the self-guided flying vehicle being composed of a cone located at the head of the self-guided flying vehicle, a propulsion device located at the rear of the self-guided flying vehicle and a body located between the cone and the propulsion device. The optical detection device comprises at least two portholes disposed in a collar on the periphery of the body of the self-guided flying vehicle.

Thus it is possible to limit the exposure to shocks and to thermal heating of an optical detection device of the self-guided flying vehicle while preserving the symmetry of the self-guided flying vehicle.

According to a particular embodiment of the invention, the portholes are inclined with respect to the propagation axis of the self-guided flying vehicle so that the angle formed by the normal to the surface of the portholes and by the propagation axis of the self-guided flying vehicle is between 10° and 60°.

Thus the effects of the thermal heating and the impacts related to the environment are minimised. In addition, the aerodynamics of the self-guided flying vehicle is preserved.

According to a particular embodiment of the invention, the portholes have a plane surface.

Thus the optical detection device and the portholes are manufactured easily. In addition, the processing of the optical signal passing through the porthole is simplified.

According to a particular embodiment of the invention, the optical detection device further comprises, for at least some of the portholes, an optical system associated with each porthole, the optical system being placed behind the porthole and comprising a curved mirror reflecting the optical signal towards a plane mirror. The optical detection device also comprises at least one optical sensor whereon at least one optical signal reflected by a curved mirror and a plane mirror is directed, the optical sensor being connected to an information processing device.

Thus the optical signal received through the portholes can be processed and analysed.

According to a particular embodiment of the invention, the optical detection device further comprises, for each optical sensor, a focusing system placed between the plane mirror and the optical sensor.

Thus the focusing done by the mirrors can be adjusted without there being any need to move the mirrors, and focusing errors can be corrected.

According to a particular embodiment of the invention, all the portholes of the optical detection device have identical optical characteristics. All the optical systems associated with the portholes direct and focus the optical signals received through the portholes onto the same optical sensor, and the optical sensor generates information representing all the optical signals received through said portholes.

Thus it is possible to obtain an image of an object located in front of the self-guided flying vehicle.

According to a particular embodiment of the invention, the optical sensor is integrated in a filtering module comprising at least two spectral filters of different spectral bands.

The filtering module extracts, from the optical signals received, a filtered optical signal in each of the spectral bands and generates information representing each filtered optical signal.

Thus it is possible to obtain, from portholes with identical optical characteristics, a plurality of images of an object in various spectral bands.

In a particular embodiment of the invention, at least one of the portholes has optical characteristics different from the other portholes. All the optical systems associated with portholes with identical optical characteristics direct and focus the optical signals received through the portholes onto the same optical sensor, and optical systems associated with portholes with different optical characteristics direct and focus the optical signals received through the portholes with different optical characteristics onto different optical sensors.

Thus it is possible to obtain a plurality of images of the same object with different optical characteristics.

According to a particular embodiment of the invention, the portholes with different optical characteristics have different spectral bands.

Thus it is possible to obtain a plurality of images of the same object in various spectral bands. In addition, it is possible to adapt the portholes using materials adapted to the detection spectral bands and the resistance to shocks of which is the best for each spectral band.

According to a particular embodiment of the invention, the optical detection device comprises, for at least some of the portholes, an imager associated with each porthole, the imager being placed so as to directly receive at least one optical signal passing through at least one porthole.

Thus it is possible to process an optical signal received through a porthole independently and without requiring an optical system or mirrors.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

The present invention consists of an optical detection device the portholes of which are placed in a collar on the body of a self-guided flying vehicle.

Figure 1:
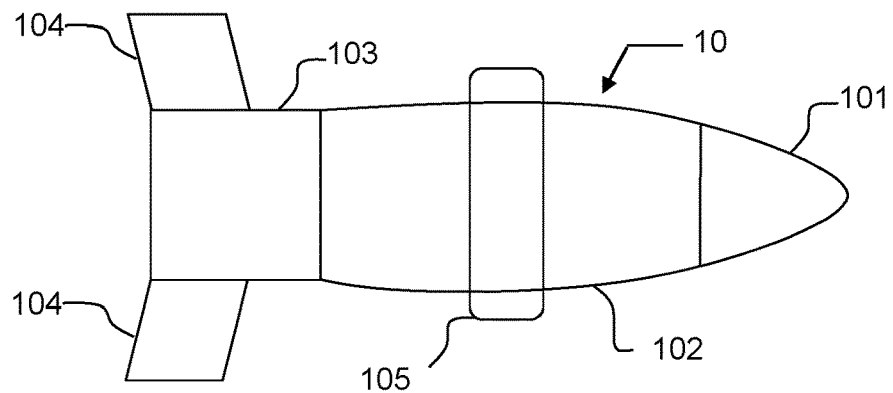
FIG. 1 illustrates schematically a self-guided flying vehicle wherein the present invention is implemented.

FIG. 1 illustrates schematically the self-guided flying vehicle 10 that comprises a cone 101 located at the head of the self-guided flying vehicle 10, a propulsion device 103 located at the rear of the vehicle and a body 102 located between the cone 101 and the propulsion device 103. The self-guided flying vehicle 10 also comprises a wing unit 104 that consists of appendages that can be located at the rear of the self-guided flying vehicle 10 level with the propulsion device 103 or on the body 102. The self-guided flying vehicle 10 further comprises an optical detection device 105, the portholes of which are disposed, according to the present invention, in a collar on the body 102.

Figure 2A:
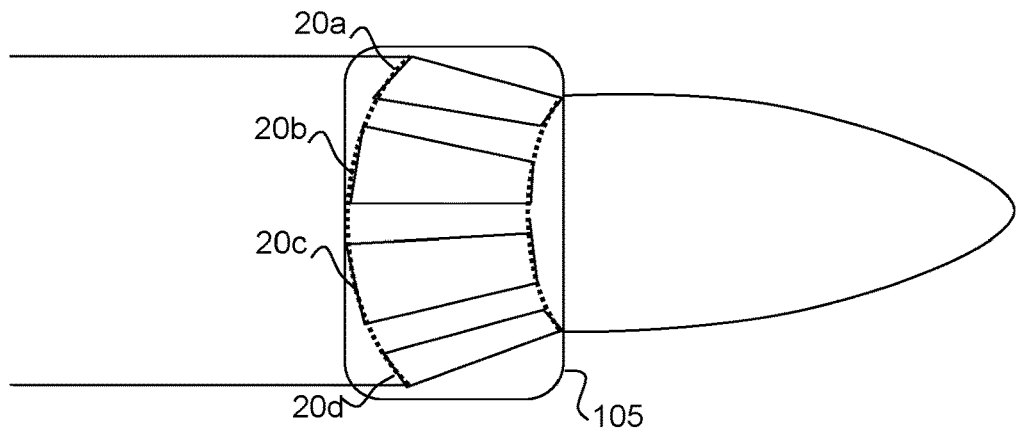
FIG. 2a illustrates schematically in profile view an optical detection device comprising portholes disposed in a collar on the body of a self-guided flying vehicle.

FIG. 2a shows, in profile view, the optical detection device 105 the portholes of which are disposed in a collar on the body 102 of the self-guided flying vehicle 10. The optical detection device 105 comprises a plurality of portholes 20a, 20b, 20c and 20d corresponding to windows through which the optical signal coming from outside is recovered. In the example of FIG. 2a, four portholes 20a to 20d are shown. The portholes 20a to 20d are disposed in a collar on the surface of the self-guided flying vehicle 10. In other words the portholes 20a and 20d are positioned on the periphery of the body 102 of the self-guided flying vehicle 10, thus forming a ring around the self-guided flying vehicle 10.

The collar arrangement of the portholes 20 keeps the symmetry of the self-guided flying vehicle 10 and the aerodynamics thereof. The arrangement of the portholes 20 on the body 102 minimises the effects of thermal heating or impacts related to the environment such as rain erosion.

The portholes may be identical but also may differ from each other through the nature of their material. For example, one of the portholes may be formed from sapphire, which makes it possible to recover optical signals in the spectral band from 0.3 μm to 5 μm, while another porthole may be made from zinc sulfide, more fragile than sapphire but allowing the recovery of optical signals in a spectral band with higher wavelengths, up to 15 μm. The portholes may also differ from each other through the dimensions thereof and the curvature of the surface thereof. The portholes may thus have a plane external surface, which allows easier manufacture and simplifies the processing of an optical signal received through the porthole.

Figure 2B:
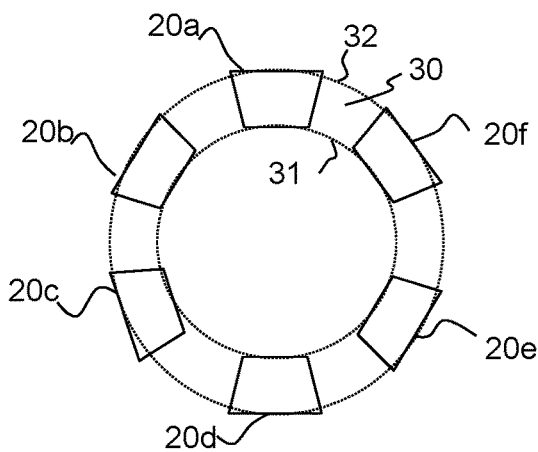
FIG. 2b illustrates schematically in front view an optical detection device comprising portholes disposed in a collar on the body of a self-guided flying vehicle.

FIG. 2b presents a front view of the optical detection device 105, the portholes of which are disposed in a collar. The optical signal is recovered in a band or an annular zone 30 on the periphery of the self-guided flying vehicle 10 delimited by the external perimeter 31 of the part of the self-guided flying vehicle 10 located at the front of the optical detection device 105 on the one hand and the external perimeter 32 of the part of the self-guided flying vehicle 10 located at the rear of the optical detection device 105 on the other hand. The portholes 20a to 20f are located in the annular zone 30 and are distributed all around the vehicle. They are disposed regularly or with variable spacings. In the example in FIG. 2b, six portholes are shown. Naturally a greater or lesser number of portholes can be used by the present invention.

Figure 3:
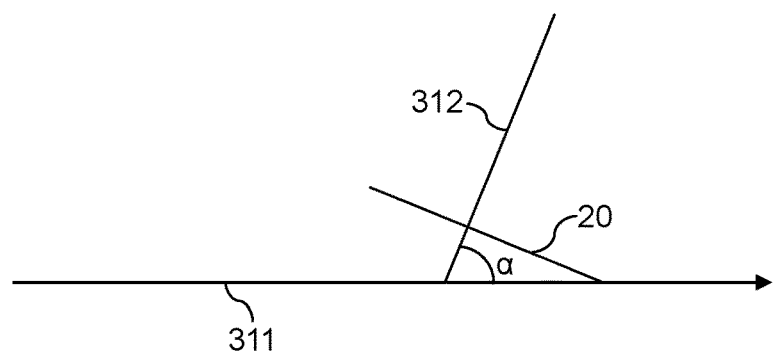
FIG. 3 shows the inclination of each porthole with respect to the propagation axis of the self-guided flying vehicle.

FIG. 3 shows the inclination of each porthole 20 with respect to the propagation axis of the self-guided flying vehicle 10.

Each porthole 20 is inclined with respect to the surface of the body 102 of the self-guided flying vehicle 10 so that an optical signal coming from the front of the self-guided flying vehicle 10 can be recovered.

The angle α between the propagation axis 311 of the self-guided flying vehicle 10 and the normal 312 to the surface of the porthole 20 is between 10° and 60°, preferentially between 20° and 40°.

Figure 4:
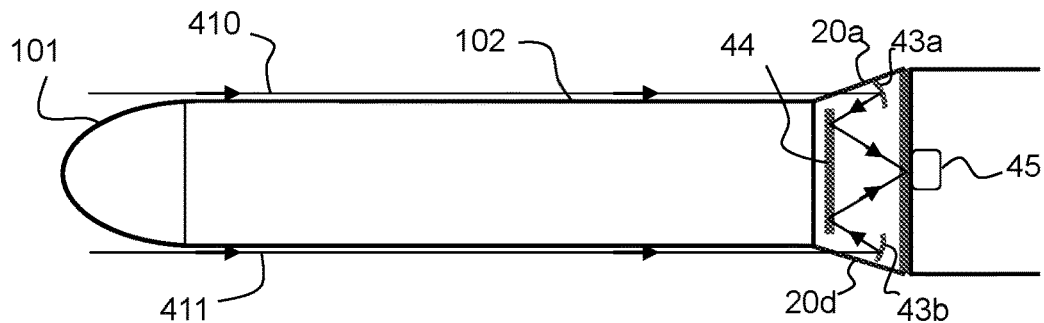
FIG. 4 illustrates schematically a first example of the path of an optical signal in the optical detection device, wherein the portholes of the optical detection device disposed in a collar have identical characteristics.

FIG. 4 illustrates schematically a first example of the optical-signal path in the optical detection device 105, wherein the portholes of the optical detection device 105 have identical characteristics.

The optical detection device 105 comprises in this example two portholes 20a and 20d. It also comprises an optical system associated with each porthole, the first optical system associated with the porthole 20a comprises a curved mirror 43a that reflects the optical signal towards a plane mirror 44, the plane mirror 44 reflecting the optical signal towards an optical sensor 45, and the second optical signal associated with the porthole 20d comprises a curved mirror 43b that reflects the optical signal towards the plane mirror 44, the plane mirror 44 reflecting the optical signal towards the optical sensor 45.

The beam 410 represents the optical path, through the optical detection device 105, of the optical signal coming from the front of the self-guided flying vehicle 10 in a propagation direction between 2.5° and 5° with respect to that of the self-guided flying vehicle 10 and incident on the porthole 20a. The beam 410 passes through the inclined porthole 20a placed on the body 102 of the self-guided flying vehicle 10, is focused and reflected by the curved mirror 43a towards the plane mirror 44 and then once again reflected by the plane mirror 44 towards the optical sensor 45. Similarly and symmetrically, the beam 411 represents the optical path of the optical signal coming from the front of the self-guided flying vehicle 10 with a propagation direction between 2.5° and 5° with respect to that of said self-guided flying vehicle 10 and incident on a porthole 20d. The beam 411 passes through the porthole 20d in an identical manner to the porthole 20a, is focused and reflected by the curved mirror 43b towards the plane mirror 44, and then once again reflected by the plane mirror 44 towards the optical sensor 45.

The optical sensor 45 thus conjointly receives the optical signals represented by the respective beams 410 and 411. The optical sensor 45 next generates information representing all the optical signals detected and transmits said information to an information processing device.

In the case of the optical detection device 105 comprising for example six identical portholes 20a to 20f, the reception, through all the portholes 20a to 20f, of optical signals coming from an object located optically at infinity with respect to the optical detection device 105, the focusing thereof on the same optical sensor 45 and the generation of information representing all of said optical signals, makes it possible to obtain for example an image of the object.

In a particular embodiment, a focusing system, not shown in FIG. 4, is added to the optical detection device 105 in front of the optical sensor 45. The focusing system is inserted in the optical systems so that it is placed between the plane mirror 44 and the optical sensor 45 and thus makes it possible to adjust the focusing made by the mirrors and to correct any error in focusing of the beams.

In a particular embodiment, the optical sensor 45 is integrated in a filtering module comprising spectral filters having various spectral bands. The filtering module thus makes it possible to extract, from the optical signals received, a filtered optical signal in each of said spectral bands. The filtering module then generates information representing each of the filtered optical signals, in other words representing the optical signals received in each of said spectral bands.

Figure 5:
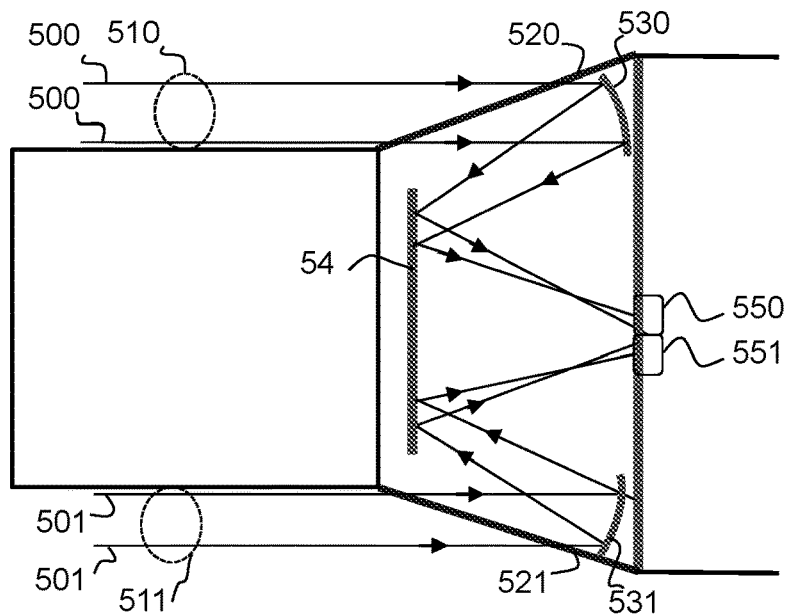
FIG. 5 illustrates schematically a second example of the path of an optical signal in the optical detection device, wherein the portholes of the optical detection device disposed in a collar have different characteristics.

FIG. 5 illustrates schematically a second example of the optical-signal path in the optical detection device 105, wherein the portholes disposed in a collar have different characteristics.

In this example, the optical detection device 105 comprises two portholes 520 and 521 with different characteristics. More precisely, the porthole 520 allows a first range of wavelengths to pass, in other words it has a first spectral band, while the porthole 521 allows a second range of wavelengths to pass, in other words it has a second spectral band, different from the first spectral band of the porthole 520.

An optical detection path is associated with each of the spectral bands. An optical detection path thus comprises one or more portholes with the same spectral band, an optical system associated with each of the portholes making it possible to direct and focus the optical signals on a first zone, and an optical sensor located in said zone and sensitive to the wavelengths of the spectral band of said portholes.

The beam 510 consists of rays such as the rays 500 and represents the path of the optical signal coming from the front of the self-guided flying vehicle 10 and incident on a porthole 520. The beam 510 passes through the porthole 520 towards an optical system through which the beam 510 is reflected and focused by the curved mirror 530 in the direction of the plane mirror 54 and then once again reflected by the plane mirror 54 towards an optical sensor 550 sensitive in the spectral band of the porthole 520. The optical sensor 550 thus receives the optical signal represented by the beam 510 in the spectral band of the porthole 520. The beam 511 consists of rays such as the rays 501 and represents the path of the optical signal coming from the front of the self-guided flying vehicle 10 and incident on a porthole 521. The beam 511 passes through the porthole 521 towards an optical system through which the beam 511 is reflected and focused by the curved mirror 531 in the direction of the plane mirror 54 and then once again reflected by the plane mirror 54 towards an optical sensor 551 sensitive in the spectral band of the porthole 521. The optical sensor 551 thus receives the optical signal represented by the beam 511 in the spectral band of the porthole 521.

Each of the optical sensors 550 and 551 generates information representing the optical signal that it detects and transmits said information to an information processing device.

In a particular embodiment, a focusing system, not shown in FIG. 5, is added to each optical detection channel of the optical detection device 105 in front of each optical sensor 550 and 551. For example, a focusing system is inserted in the optical system associated with the porthole 520 and placed between the plane mirror 54 and the optical sensor 550, and another focusing system is inserted in the optical system associated with the porthole 521 and placed between the plane mirror 54 and the optical sensor 551. The focusing systems make it possible to adjust the focusing made by the mirrors and to correct any error in focusing of the beams.

In a particular embodiment, the optical detection device 105 is divided into two sectors, in other words into two optical detection channels, each of the optical detection channels comprises portholes with characteristics identical to each other and different from the characteristics of the portholes of the other optical detection channel. For example, the optical detection device 105 is divided into two half rings. The first half ring corresponding to the first optical detection channel comprises the portholes 20a, 20b and 20c all having the same spectral band as that of the porthole 520, an optical system associated with each of the portholes 20a, 20b and 20c and an optical sensor sensitive to the spectral band of the portholes 20a, 20b and 20c such as the optical sensor 550. Similarly, the second half ring corresponding to the second optical detection channel comprises the portholes 20d, 20e and 20f all having a second spectral band such as that of the porthole 521, said second spectral band being different from the first spectral band of the portholes 20a, 20b and 20c. The second optical detection channel also comprises an optical system associated with each of the portholes 20d, 20e and 20f, and an optical sensor sensitive to the spectral band of said portholes 20d, 20e and 20f such as the optical sensor 551. The first optical detection channel thus makes it possible to detect an optical signal in the first spectral band while the second optical detection channel detects an optical signal in the second spectral band.

For an object optically located at infinity with respect to the optical detection device 105, the reception, through two distinct optical detection channels, of the optical signals coming from the object, the focusing, for each optical detection channel, of the optical signals on the same optical sensor, and the generation, for each of the optical sensors, of information representing the optical signal detected makes it possible to obtain for example two images of the same object in two different spectral bands.

In another embodiment, the portholes all have distinct characteristics, for example different spectral bands, and the number of optical detection channels then corresponds to the number of spectral bands transmitted, in other words to the number of portholes.

Figure 6:
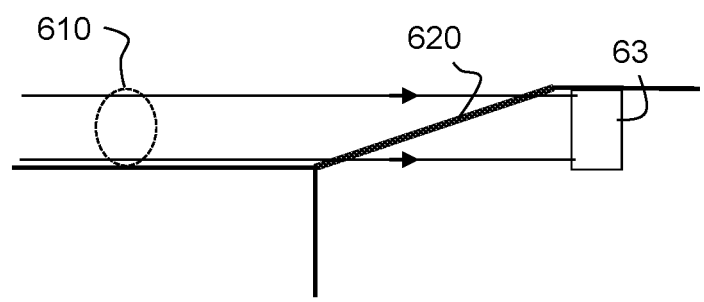
FIG. 6 illustrates schematically an optical detection device that comprises an imager behind a porthole.

FIG. 6 illustrates schematically an optical detection device 105 the portholes of which are disposed in a collar that comprises an imager placed behind a porthole. The beam 610 represents the optical path of an optical signal incident on a porthole 620 and coming from the front of the self-guided flying vehicle 10 in a propagation direction the inclination of which is between 2.5° and 5° with respect to the propagation direction of the self-guided flying vehicle 10. The beam 610 passes through the porthole 620 and is directly detected by an imager 63, for example an imager on a cardan joint. The imager 63 is placed just behind the porthole and oriented towards the outside of the self-guided flying vehicle 10, for example towards the front, so that the detection axis of said imager 63 is directed in the axis of an incident beam such as the beam 610. The position of the imager 63 thus makes it possible to detect an optical signal directly through a porthole without requiring an optical system or reflection on a mirror.

In the example in FIG. 6, a single porthole is allocated to the use of an imager 63. The other portholes of the optical detection device 105 may also be allocated to the use of an imager 63 or used for detecting the optical signal in the configurations as presented in FIG. 4 or 5. In other words, the optical detection device 105 comprises, for a first set of portholes, an imager 63 associated with each porthole, the imager 63 being placed behind the porthole, and the optical detection device 105 comprises, for a second set of portholes, an optical system associated with each porthole, the optical system being placed behind the porthole and comprising a curved mirror reflecting the optical signal towards a plane mirror, as well as at least one optical sensor onto which at least one optical signal reflected by a curved mirror and a plane mirror is directed, the optical sensor being connected to an information processing device.

Figure 7:
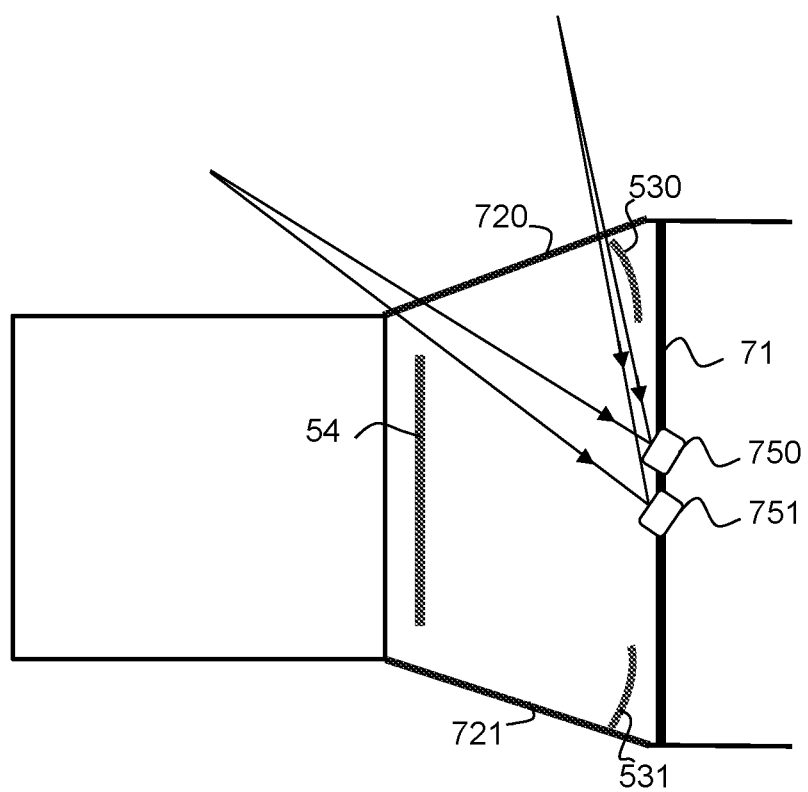
FIG. 7 illustrates schematically an optical detection device that comprises an imager oriented through the porthole towards the side of the self-guided flying vehicle.

FIG. 7 illustrates schematically an optical detection device 105 the portholes of which are disposed in a collar and which comprises an imager 750 or a plurality of imagers 750 and 751 placed at the centre of the self-guided flying vehicle 10. The imagers 750 and 751 are mounted on a platform 71 that makes it possible to vary their orientation. Each of the imagers 750 and 750 is thus oriented so that its detection axis is directed towards the outside of the self-guided flying vehicle 10 through a lateral porthole, for example the porthole 720. The orientation of the imagers 750 and 751 thus makes it possible to detect an optical signal coming from the sides of the self-guided flying vehicle directly through a porthole without requiring an optical system or reflection on a mirror.

The invention claimed is:

1. An optical detection device included in a self-guided flying vehicle, the self-guided flying vehicle being composed of a cone located at the head of the self-guided flying vehicle, a propulsion device located at the rear of the self-guided flying vehicle and a body located between the cone and the propulsion device, wherein the optical detection device comprises at least two portholes disposed in a collar on the periphery of the body of the self-guided flying vehicle, and it further comprises, for at least one of the portholes:
    an optical system associated with each of the at least one of the portholes, the optical system being placed behind said porthole and comprising a curved mirror reflecting the optical signal towards a plane mirror,
    at least one optical sensor whereon at least one optical signal reflected by a curved mirror and a plane mirror is directed, the optical sensor being connected to an information processing device.

2. The optical detection device according to claim 1, wherein the portholes are inclined with respect to the propagation axis of the self-guided flying vehicle so that the angle formed by the normal to the surface of the portholes and by the propagation axis of the self-guided flying vehicle is between 10° and 60°.

3. The optical detection device according to claim 1, wherein the portholes have a plane surface.

4. The optical detection device according to claim 1, wherein the optical detection device further comprises, for each optical sensor, a focusing system placed between the plane mirror and the optical sensor.

5. The optical detection device according to claim 1, wherein all the portholes have identical optical characteristics, all the optical systems associated with the portholes direct and focus the optical signals received through the portholes onto the same optical sensor, and the optical sensor generates information representing all the optical signals received through the portholes.

6. The optical detection device according to claim 5, wherein the optical sensor is integrated in a filtering module comprising at least two spectral filters of different spectral bands, the filtering module extracts, from the optical signals received, a filtered optical signal in each of the spectral bands and generates information representing each filtered optical signal.

7. The optical detection device according to claim 1, wherein at least one of the portholes has optical characteristics different from the other portholes, in that all the optical systems associated with portholes with identical optical characteristics direct and focus the optical signals received through the portholes onto the same optical sensor and optical systems associated with portholes with different optical characteristics direct and focus the optical signals received through the portholes with different optical characteristics onto different optical sensors.

8. The optical detection device according to claim 7, wherein the portholes with different optical characteristics have different spectral bands.

9. A self-guided flying vehicle, wherein it comprises an optical detection device according to claim 1.

* * * * *